United States Patent [19]
Snively

[11] 3,760,493
[45] Sept. 25, 1973

[54] METHOD OF WINDING A DYNAMOELECTRIC MACHINE WITH REDUCED COIL DISTORTION

[75] Inventor: Howard Donald Snively, Schenectady, N.Y.

[73] Assignee: General Electric Company, Schenectady, N.Y.

[22] Filed: Oct. 13, 1971

[21] Appl. No.: 188,937

Related U.S. Application Data

[62] Division of Ser. No. 30,047, April 20, 1970, Pat. No. 3,631,278.

[52] U.S. Cl. .................. 29/596, 29/606, 310/42
[51] Int. Cl.. H02k 15/00, H02k 15/14, H02k 15/16
[58] Field of Search ................ 29/596, 598, 605, 29/606; 310/42, 208, 202

[56] References Cited
UNITED STATES PATENTS

| | | | |
|---|---|---|---|
| 1,915,778 | 6/1933 | Dreese | 310/202 |
| 3,422,292 | 1/1969 | McCoy | 310/208 UX |
| 3,662,199 | 3/1971 | Anderson et al. | 310/208 |

*Primary Examiner*—Charles W. Lanham
*Assistant Examiner*—Carl E. Hall
*Attorney*—Vale P. Myles et al.

[57] ABSTRACT

An axially slotted dynamoelectric machine member to be wound with two preformed coil sides per slot is provided with a plurality of circumferentially adjacent slots having a depth equal to approximately three times the radial dimension of one coil side. The number of such deep slots is selected to be at least equal to the number of slots in one coil span. In this way, first, second and third slot positions are provided in such slots. A first group of coils are formed having the coil sides in one circumferential direction adapted to be the radially inner coil sides and the other coil sides adapted to be the radially outer coil sides. A second group of coils are formed oppositely to the first group (i.e. with the coil sides in the particular one circumferential direction adapted to be the radially outer coil sides and the other coil sides adapted to be the radially inner coil sides). The coils of one group are sequentially placed in overlapping relation in the slots in the second and third slot positions proceeding in one circumferential direction and the coils of the other group are thereafter placed in the slots in the first and second slot positions proceeding in the other circumferential direction. In this way, a winding is completed without distorting coils by raising any previously placed coil sides from their slots as required in completing corresponding windings of form coils heretofore.

2 Claims, 8 Drawing Figures

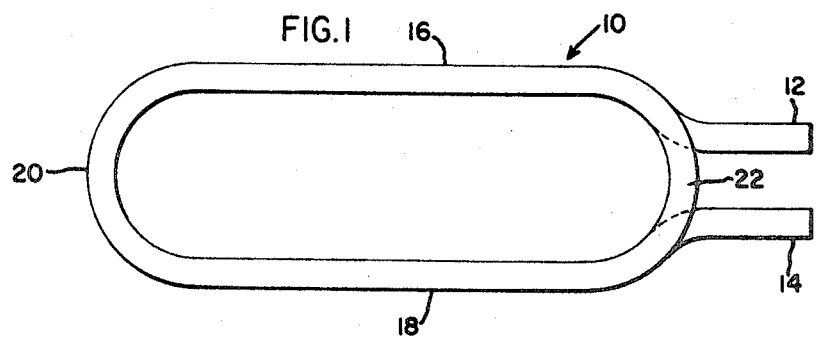
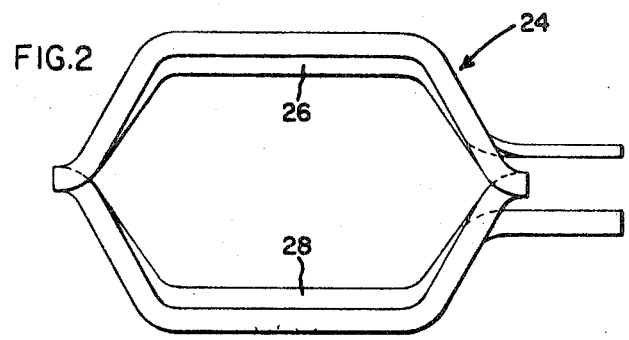
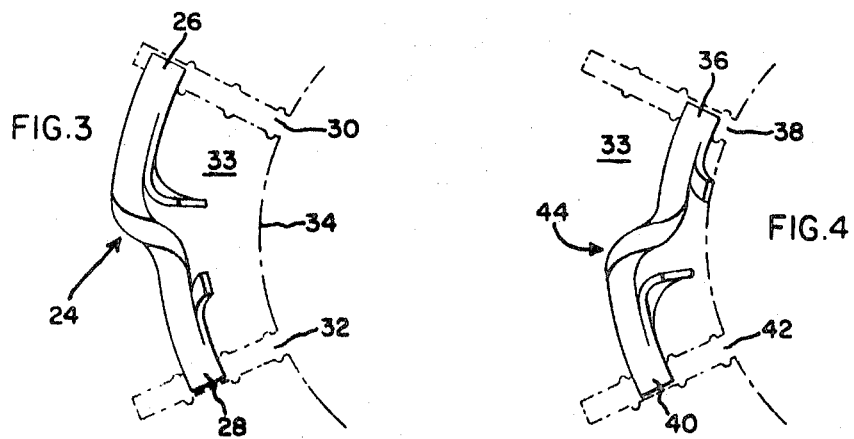

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 15 | 16 |  |  |  |  |  |  |  |  |  | 1 | 2 | 3 | 4 | 5 | 6 | 7 | 8 | 9 | 10 | 11 | 12 | 13 | 14 |
| 6 | 7 | 8 | 9 | 10 | 11 | 12 | 13 | 14 | 15 | 16 |  |  |  |  |  |  |  | 1 | 2 | 3 | 4 | 5 |

48 → arrows → 50
46

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 21 | 20 | 19 | 18 | 17 | 16 | 15 | 14 | 13 |  |  |  |  |  |  |  |  |  |  |  |  | 24 | 23 | 22 |
| 1 | 2 | 3 | 4 | 5 | 6 | 7 | 8 | 9 | 10 | 11 | 12 | 24 | 23 | 22 | 21 | 20 | 19 | 18 | 17 | 16 | 15 | 14 | 13 |
|  |  |  |  |  |  |  |  |  | 1 | 2 | 3 | 4 | 5 | 6 | 7 | 8 | 9 | 10 | 11 | 12 |  |  |  |

70, 68, 72, 66

26 27 28 29 30 31 32 33 34 35 36 1 2 3 4 5 6

84, 82, 31 32 33 34 35 36 6 7 8 9 10 11
26 27 28 29 30 31 32 33 34 35 36 5 4 3 2 1 6
5 4 3 2 1

80, 74, 76, 78

METHOD OF WINDING A DYNAMOELECTRIC MACHINE WITH REDUCED COIL DISTORTION

This is a division of application Ser. No. 30,047, filed April 20, 1970, now U.S. Pat. No. 3,631,278.

BACKGROUND OF THE INVENTION

In the manufacture of dynamoelectric machines there are two basically different winding techniques employed. In the first winding technique one, or occasionally more than one, relatively flexible conductor is serially led down one core slot, in one axial direction, and back in the other axial direction through another core slot a plurality of times, usually by machine, to fabricate a coil having a predetermined number of conductor turns. The particular coil is thereby wound and formed in place in the associated magnetic core. Alternatively, the coil of flexible conductors is wound first around a bobbin to provide a desired coil which is thereafter formed in place in the core slots to provide a machine winding. The essential attribute of such a winding technique is that the individual conductors are flexible, like a baling wire, and, while the coil so formed may be a compact bundle of conductors, yet the coil itself is readily deformable since the individual conductor strands act essentially independently in the sense that reative movement between conductors is restrained chiefly only by surface friction among adjacent conductors. The conductors in such windings are typically round copper or aluminum wires having a thin resinous film or serving of insulating material to provide what is commonly called magnet wire. The machines having windings in accord with this first technique are oftentimes characterized as "random" or "mush" wound machines. Most machine windings are made using this first technique because it is a relatively simple and inexpensive procedure, however in many other machines, typically from the low integral horsepower range upward, insulation requirements make it necessary to resort to "form" coils which is the second winding technique and the one in which the present invention is most advantageously used as will be disclosed hereinafter. In the second technique the coils are performed prior to insertion in the core slots and the machines so constructed are frequently characterized as "form wound" machines. The conductors in the typical form coils are bars or strips of copper or aluminum which carry a conductor insulation usually in the form of a plurality of layers of fabric, micaceous material and/or resinous compositions. After a coil is wound with such conductors, it is thereafter covered with coil insulation that binds the conductors together and severely restricts any relative motion therebetween thereafter. Thus, the form coil is a rigid structure relative to the typical random coil that does not employ such coil insulation. Moreover, after the coils are pulled into their final form for insertion in the core slots, sometimes insulation requirements demand that the formed coil be impregnated with a resinous material which is thereafter hardened. In such cases the conductors are actually bonded together and form with the outer coil insulation an integral structure which is very rigid and which is most susceptible to insulation damage if significantly deformed. On the other hand, the placement of form coils in the slots in accordance with presently known techniques features a step, usually toward the end of the coil placement procedure, known as "raising the jump." This step involves bending one or more previously placed coils in order to lift one of their coil sides temporarily out of the slot in which it was placed, in order to insert sides of later-placed coils underneath, while the other sides of the coils so lifted remain tightly and essentially immovably gripped in their respective slots. This lifting operation substantially distorts the coils and is hazardous to the insulation qualities of all form coils, particularly those impregnated with hardened (usually thermoset) resinous compositions, such as the otherwise desirable epoxy resins.

SUMMARY OF THE INVENTION

The present invention is a form wound dynamoelectric machine wherein the coils are inserted in the core slots to provide a winding without the need for lifting or raising the sides of any previously positioned coils. In the common case of windings having two coil sides per slot and coils of equal span, the apparatus of this invention is characterized by core having at least one continuous series of slots which are radially deep enough to accommodate three coil sides (first, second and third coil side positions), with the top, or first, positions of such slots open. The minimum number of slots in such a series is equal to one coil span. The corresponding method of this invention is characterized by serially placing one group of coils with respective sides in third and second slot positions proceeding in one circumferential direction and thereafter reversing circumferential direction and placing coils in another group with respective sides in second and first slot positions, until the desired number (two in this case) of coil sides per slot are in place. The invention is further characterized by at least two groups of form coils which are pulled, or formed, oppositely and by slots having coil side wedges disposed other than at the top-most position of the slots.

DESCRIPTION OF THE DRAWINGS

While the specification concludes with claims particularly pointing out and distinctly claiming that which is regarded as the present invention, the details of preferred embodiments of the invention may be more readily ascertained from the following detailed description when read in conjunction with the accompanying drawings in which:

FIG. 1 depicts a coil prior to being preformed;

FIG. 2 illustrates a typical coil which has been preformed by pulling in a given direction;

FIG. 3 is an end view of the coil of FIG. 2 as it would appear alone in a dynmoelectric machine;

FIG. 4 is an end view of a coil which has been pulled in a direction opposite to the direction in which the coil of FIGS. 2 and 3 as such is pulled, as such oppositely pulled coil would appear alone in a dynamoelectric machine;

DETAILED DESCRIPTION

Figures 5, 6, 7, 8:
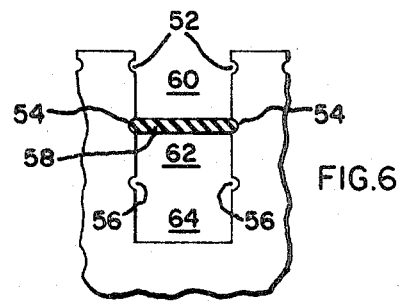
FIG. 5 is a schematic developed surface representation of a partially wound cylindrical machine core in accordance with typical prior practice.
FIG. 6 is a cross-sectional view of a deep core slot adapted for practice of the invention.
FIG. 7 is a schematic developed surface representation of a cylindrical machine core wound in accordance with the preferred embodiment of the invention; and, FIG. 8 is a schematic developed surface representation of a cylindrical machine core wound in accordance with an alternative embodiment of the invention.

Referring now to FIG. 1, there is illustrated therein a dynamoelectric machine coil 10 suitable for forming a portion of the winding of such machine. The coil 10 is typically constructed by winding a plurality of turns of an insulated conductive member about a bobbin or other object, such as a mandrel. Coil leads 12 and 14 are the beginning and termination, respectively, of coil 10 and are brought out for later connection into a suitable winding after the coil is formed and inserted in the appropriate slots of the dynamoelectric machine. Coil 10 has a first major coil side 16 and a second major coil side 18, as well as opposing semi-circular end portions 20 and 22.

In order to provide a winding coil suitable for use in a dynamoelectric machine the coil 10 is preformed, usually by machine, and can take the general form illustrated in FIG. 2. The preformed coil 24 that is illustrated in FIG. 2 is made by a process known as "pulling." In the pulling of coils, coil sides such as 16 and 18 are firmly grasped or secured in a machine designed for this purpose and forced in opposite directions in planes perpendicular to the view in FIG. 1 to provide corresponding preformed coil sides 26 and 28, respectively. For example, coil side 16 can be pulled outwardly, toward the observer, in a plane perpendicular to itself as shown in FIG. 1 and coil side 18 is correspondingly pushed inwardly away from the observer when viewing a coil is shown in FIG. 1. At the same time, the coil sides are miven slight but opposite twists about their respective axes. The amount of such twist increases as the coil span, or perpendicular distance between opposed coil sides, measured in terms of equivalent number of coil slots, increases relative to the total number of slots available in the dynamoelectric machine core to be wound. The particular coil selected for illustration in FIG. 2 is suitable for use in a two-pole winding which it will be appreciated is the kind which particularly highlights the twisting aspects of coil pulling. The coil is usually thereafter provided with coil insulation as by wrapping tightly with a fabric in overlapping relationship or by encapsulation in a molded resinous material, for examples, to provide an outer sheath surrounding the conductors of the coil.

FIG. 3 is an end view of coil 24, from the lead end or right hand side as depicted in FIG. 2. The coil 24 is shown in place alone in the appropriately spaced slots of a dynamo-electric machine, two of which slots 30 and 32 are shown only in FIG. 3. For purposes of illustration, the dynamoelectric machine member is selected to be a stator 33, although it will be appreciated that a rotor could have been equally advantageously shown for illustrative purposes. In FIG. 3, coil side 26 is shown in slot 30 in the third coil side position thereof whereas coil side 28 is depicted in the second coil side position of slot 32. For purposes of defining the present invention, the first coil side position is what is sometimes referred to as the top coil side position and is defined herein to be in that position in the three coil side positions which is relatively closest to the air gap of the machine. In FIG. 3, surface 34 is the stator surface which is adjacent the air gap. The second coil side position is defined as the next adjacent coil side position, moving radially in a particular slot, to the first coil side position and the third coil side position is defined as that coil side position adjacent to the second coil side position, again moving further radially in respect to the particular slot.

FIG. 4 is an end view of another preformed coil which differs from the coil shown in FIGS. 2 and 3 in that the coil of FIG. 4 is pulled in the opposite circumferential direction during preforming. The result of this difference is illustrated by comparing FIGS. 3 and 4. In FIG. 3, the coil side 26 which is in the clockwise circumferential direction is in the radially outermost third coil side position and the other coil side 28, moving in the counter-clockwise circumferential direction, is in the next radially inwardly or second coil side position. In contrast, in FIG. 4 coil side 36 in slot 38 is the coil side in the clockwise circumferential direction and coil side 40 in slot 42 is the coil side in the opposite circumferential or counter-clockwise direction and it will be noted that in this case the coil side 36 is in the radially inwardly most slot position whereas coil side 40 is in the next adjacent coil side position moving radially outwardly. Thus, if coil side 28 of coil 24 is in the second slot position, then coil side 26 is adapted to be in the third slot position. I contrast, as seen in FIG. 4, if coil side 40 of coil 44 (that corresponds in circumferential positioning to coil side 28) is in the second slot position, then coil side 36 is adapted to be in the first coil side position.

The characteristics of a winding in accord with the invention, using groups of coils which are oppositely pulled, is more clearly understood by a brief description of the problem which exists in connection with windings consisting of form coils pulled in only one direction. FIG. 5 schematically illustrates a dynamoelectric machine member having 24 slots, each with two coil side positions. It will be appreciated that in the actual member the slots are separated by teeth and open into an air gap. In the case of a stator, for examle, the slots would open radially inwardly and a cylindrical rotor-receiving bore would be defined, with slot 24 adjacent to slot 1.

The coil span as used herein means the distance between coil sides expressed in terms of the number of slots spanned. Thus, the coils of FIG. 5 are preformed as illustrated in FIG. 4 (assuming the schematic view of FIG. 5 is from the lead or connection end of the winding) and have a span of nine slots. The winding shown partially completed is suitable for part of a three-phase, two-pole, 24 slot, ¾ pitch winding, for example.

The coil sides in FIG. 5 are numbered in the order of their sequential placement in the slots. Thus, the coil sides 46 and 48 belong to the first coil placed in the slots. This coil is designated for descriptive purposes herein coil No. 1 in FIGS. 5, 7 and 8, with corresponding designations applied to other coils signifying their order of placement. Also, for clarity of description FIGS. 5, 7 and 8 will be assumed to depict a stator winding, although the invention is applicable to rotors as well. Thus, coil side 48 is the radially inner-most coil side (corresponding to coil side 36 in FIG. 4) and coil side 46 is the radially outermost coil side (corresponding to coil side 40 of FIG. 4) of coil No. 1.

The winding of FIG. 5 progresses counterclockwise with the placement of coils No. 2 through No. 15 inclusively. The problem becomes apparent in the embodiment of FIG. 5 when the placement of coils has progressed to the point where it is time to place coil No. 16. It will be noted that coil side 48 has been placed in the first coil side position in slot 11 and it is desired to place the radially outermost coil side of coil No. 16 in the second coil side position in slot 11. Accordingly, coil side 48 must be "raised" or pulled out of its previously placed position in order to accommodate one side of coil No. 16 beneath it. Similarly, coil No. 17 must be placed in the second coil side position in slot 12 which is occupied by one side of coil No. 2 in the first coil side position thereof. This requires sliding one coil side of coil No. 17 underneath lifted coil sides of both coil No. 1 and coil No. 2. As will be apparent, a similar difficulty exists in respect to placing the second position coil sides of coils No. 18 through No. 24, inclusively, with the latter requiring lifting of the first position coil sides of coils No. 1 through No. 9, inclusively, as depicted by the arrows, such as those shown at 50, This procedure of lifting previously placed coil sides from their positions in the slots is sometimes referred to by those skilled in the art as "raising the jump." Inasmuch as the previously placed coil sides, of the raised coils, which are in the second coil side position remain relatively tightly bound by their slot sides, the raising of coil sides in the corresponding first coil side positions causes considerable bending and distortion of the coils. Such bending and distortion is disadvantageous in respect to the quality of the insulation in such coils and, indeed, sometimes results in irreparable damage, necessitating the substitution of other coils. The deleterious effects of bending and distortion are most pronounced in the case of windings having coils which span a substantial fraction of the number of core slots (e.g. usually most pronounced in two-pole windings) and as the elasticity of the coil insulation system (both turn insulation and coil wall insulation) decreases. Thus, it might be expected that the difficulties in connection with the prior art would be most significant in the case of a form wound, two-pole machine having cured epoxy or other rigidly set resinous coil insulation.

There is illustrated in FIG. 6 a dynamoelectric machine member slot adapted in accordance with the present invention. More particularly, the slot is adapted to receive wedges in opposing grooves 52, 54 and 56 which when equipped with wedges, one of which is shown at 58 in grooves 54, is suitable for dividing the slots into a first coil side position 60, a second coil side position 62 and a third coil side position 64. A coil slot as shown in FIG. 6 used throughout a dynamoelectric machine member characterizes the preferred practice of the present invention. Those skilled in the art will recognize that many large two-pole, alternating current induction machines utilize stators having slots which are approximately three coil sides deep, largely for ventilation and cooling purposes. Such machines known heretofore may include wedge grooves as shown at 54 to accommodate a wedge as illustrated at 58. Such machines do not, however, feature three radially spaced pairs of opposing wedge-receiving grooves as shown in FIG. 6 and for the purpose to be more apparent in conjunction with the following explanation of FIG. 7.

FIG. 7 depicts schematically a three-phase, two-pole, 24 slot, ¾ pitch winding in accordance with the present invention. In preparation for receiving the winding a first group of wedges are inserted in the third or radially innermost wedge position in grooves similar to those illustrated at 56 in FIG. 6. Slots 1 through 9, inclusive, and 22, 23 and 24 are depicted as having such wedges, two of which are illustrated at 66 in slots 1 and 2, respectively. Thereafter, coils numbered 1 through 12 are sequentially positioned with the radially outermost coil slots in the third coil side position of respective slots 10 through 21, inclusive, and the radially innermost coil sides thereof are sequentially positioned in the second coil side positions of respective slots 1 through 12, inclusive. In this particular example, this initial portion of the winding is placed moving in the counterclockwise circumferential position and utilizing coils pulled in the direction shown in FIG. 4 (assuming the case where FIG. 7 depicts the lead or connection end of the winding). Thereafter, coils numbered 13 through 24, inclusive, are sequentially positioned moving in the opposite or clockwise circumferential position. Unlike the earlier group of coils that were positioned, this latter group of coils are pulled oppositely therefrom, and as shown in FIG. 3, for example. Coil 13 spans from slot 24, around slots 1 through 8, to slot 9. That is, the coils in both groups have the same span, namely, 9 slots and the difference in the directions of pulling is perhaps best illustrated in FIG. 7 by contrasting coils numbered 22, 23 and 24 in the second group with the coils numbered 1 through 12, inclusive, in the first group. When the 24 coils are in position, the second position wedges, such as 68, are inserted in slots 10 through 21, inclusively, and the first position wedges, such as 70 and 72, are inserted in the slots which initially received third position wedges in preparation for receiving the winding, namely slots 1 through 9, inclusive, 22, 23 and 24. Thus, the completion of a form wound machine is accomplished without distorting any coils incident to "raising the jump."

It will be appreciated by those skilled in the art that windings in accord with this invention can be connected to accommodate any of the number of poles for which the dynamoelectric machine member is otherwise suitable. A dynamoelectric machine having a winding as depicted in FIG. 7 can accommodate a three-phase supply, for example, by connecting coils 1, 2, 3, 4, 21, 22, 23 and 24 to phase A, connecting coils 9, 10, 11, 12, 13, 14, 15 and 16 to phase B, and connecting coils 5, 6, 7, 8, 17, 18, 19 and 20 to phase C. The aforementioned connections constitute a two-pole winding.

An alternative embodiment of the invention is illustrated in FIG. 8. In the embodiment of FIG. 7, there are open, or vacant, third coil side positions used chiefly for improved ventilation. Also, the winding is balanced in the sense that the number of coils in each group is the same and reactance of individual phases in the described connected windings are essentially equal. In general, a core having deeper slots for a given flux-carrying capability is larger in diameter and more expensive than a core having less deep slots. Thus, there are cases wherein size and/or cost considerations will more than balance considerations of ventilation or reactance. In such cases a savings in core material can be accomplished by providing only the minimum number of three-position slots, such as 74 in FIG. 8, with the remaining slots having only the required first and second coil side positions as at 76. The minimum number of three-position slots suitable for use in accordance with the present invention is equal to one coil span. In the winding illustrated in FIG. 8, the coil span can be seen to be equal to five and therefore the minimum requirement is satisfied by providing five sequential slots having three coil side positions, with the remaining slots having two coil side positions. In order to fully utilize the iron in the core, it is advantageous to provide a radially outwardly step 78 in substantial radial alignment with the slots having three coil side positions. The radial step 78 in core 80 is referred to as being in substantial radial alignment because in fact, in order to provide a substantially equal cross-section of the core body throughout, the circumferential arc of step 78 may be greater or smaller than that of the related coil slots. As described before, the winding commences with No. 1 and the first group in FIG. 8 consists of five coils pulled in one direction (as illustrated in FIG. 3) with remaining coils pulled in the opposite direction (as illustrated in FIG. 4). In the embodiment of FIG. 8, the deep slots, or those having three coil side positions, have wedges as at 82 in the second wedge position with remaining slots having wedges as at 84 in the first wedge position.

In the manufacture of dynamoelectric machines in accordance with this invention, it will be recognized by those skilled in the art that the end turns will be characterized by radially inwardly and outwardly steps occurring at different circumferential positions. One method of suitably bracing such end turns is to provide a circumferential bracing ring or rings having corresponding radial steps but otherwise generally following the invention described in U.S. Pat. No. 3,320,452.

Many modifications and variations of the invention will readily occur to those skilled in the art. For example, if balanced reactance is desired in a winding of the kind shown in FIG. 8, the number of deep slots may be greater than the minimum (i.e. coil span) to achieve this purpose. For example, in FIG. 8, six deep slots might have been selected for a three phase winding. Similarly, it may be desirable to provide more than one sequential group of deep slots in a particular core in order to accommodate particular winding configurations or for other purposes, for example, if as contrasted to the earlier assumption, the dynamoelectric machine member depicted in FIG. 8 is a rotor, it may be desirable to effect more nearly dynamic balance by providing a step similar to 78 radially inwardly from slots 14, 15, 16, 17 and 18 which are diametrically opposite the slots 32, 33, 34, 35 and 36. Also, it may be desirable to provide multiple windings in accord with the invention or to provide intermediate vacant coil side positions for ventilation or other purposes.

It will be apparent that many other modifications and variations are possible in light of the above teachings. It therefore is to be understood that within the scope of the appended claims, the invention may be practiced other than as specifically described.

What I claim as new and desire to secure by Letters Patent of the United States is:

1. A method of manufacturing a dynamoelectric machine comprising:
   a. fabricating a magnetic core having a plurality of axially extending substantially rectangular slots equally circumferentially spaced therein, at least one adjacent series of said slots comprising slots that are each divisible into three radially spaced conductor-receiving portions constituting first, second and third slot positions, with any remaining slots having at least first and second slot positions;
   b. preforming a first group of coils having coil sides in one circumferential direction adapted to be radially inner coil sides and the coil sides in the other circumferential direction adapted to be radially outer coil sides;
   c. preforming a second group of coils having coil sides in said one circumferential direction adapted to be radially outer coil sides and the coil sides in said other circumferential direction adapted to be radially inner coil sides;
   d. inserting coils from said first group sequentially into a plurality of said series of slots in overlapping relation and proceeding in a predetermined circumferential direction, the coil sides of said first group being inserted into the third and second slot positions for which they are adapted and the number of coils in said first group being at least equal to the number of slots spanned by one coil but less than or equal to the difference between the total number of slots and the number of slots spanned by one coil; and
   e. inserting the coils from said second group sequentially and in overlapping relation and proceeding in a direction opposite to said predetermined circumferential direction, the coil sides of said second group being inserted into the second and first slot positions for which they are adapted.

2. The method of claim 1 wherein each of said rectangular slots is divisible by slot wedges receivable in at least three radially spaced pairs of opposing wedge-receiving grooves in each of said slots to provide first, second and third wedge positions, and including the step of inserting wedges into third wedge positions in some of said slots prior to the step of inserting coils from said first group into said last-mentioned slots.

* * * * *